Patented Dec. 26, 1933

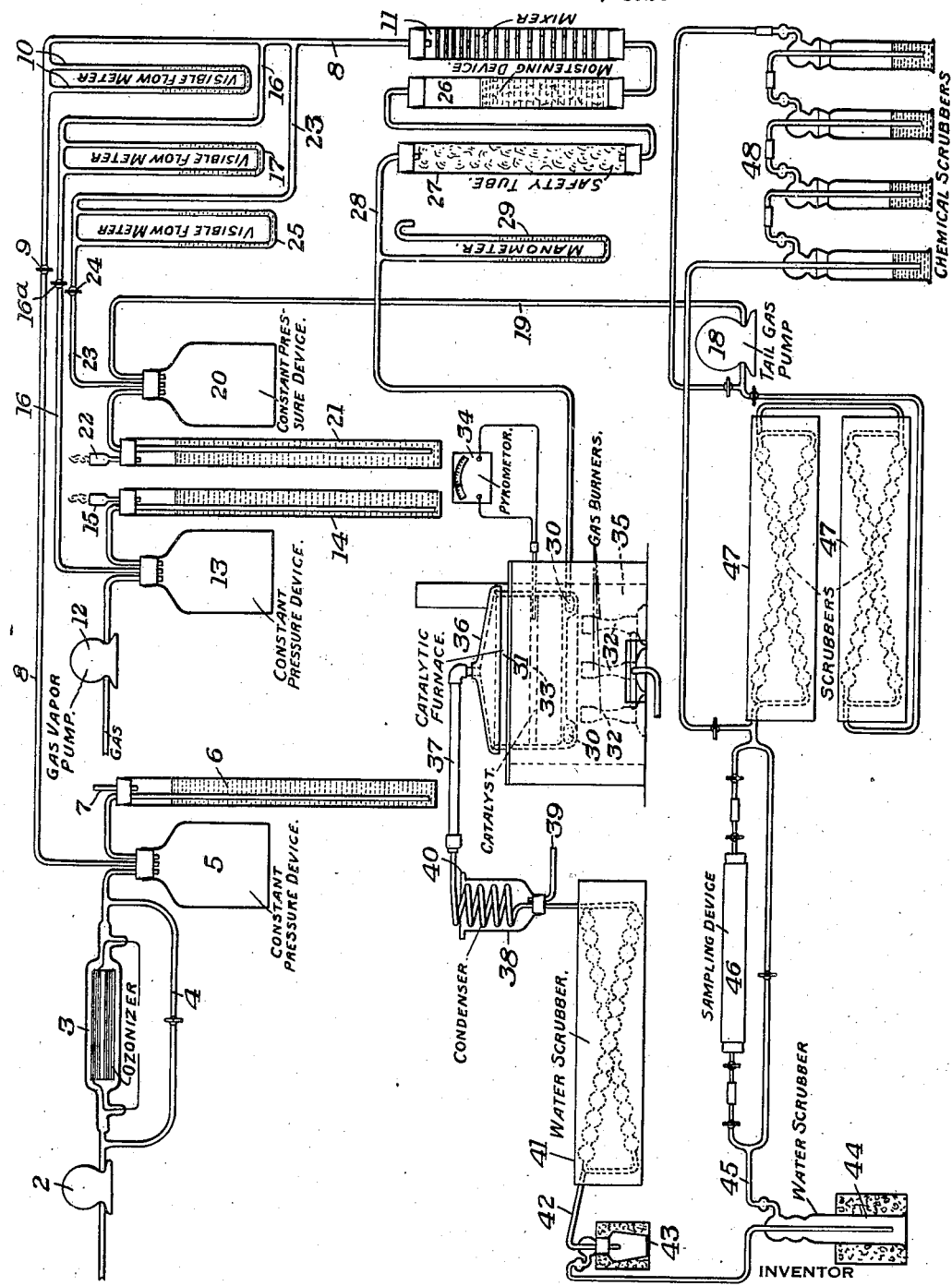

1,941,010

UNITED STATES PATENT OFFICE 1,941,010

MULTIPLE-STEP PARTIAL OXIDATION METHOD

Joseph Hidy James, Pittsburgh, Pa., assignor to Clarence P. Byrnes, trustee, Sewickley, Pa.

Original application October 21, 1924, Serial No. 745,025. Divided and this application May 26, 1933. Serial No. 673,010

9 Claims. (Cl. 260—116)

The figure is a diagrammatic view showing one form of apparatus for carrying out my invention.

This application is a division of my copending application Ser. No. 745,025, filed October 21, 1924, and relates particularly to the continuous recycling method therein disclosed in which a portion of the tail gas is bled out of the system and a fresh portion of hydrocarbon and oxygen is added. This is fully explained and described in the parent application of which the following is a true copy.

The present invention relates to the partial oxidation of hydrocarbons, preferably in gaseous form, though it may be in vapor form or in a mixture of both forms. For example, I may employ natural gas, whether dry or wet, or gaseous hydrocarbons from any source, as for example, coke oven gases, the gas from the low temperature coal carbonization processes, or the gases from the cracking of petroleum oils which carry both saturated gaseous hydrocarbons as well as unsaturated hydrocarbons belonging to the olefin series. I may also vaporize liquid hydrocarbons and mix the vapor with gases which are gaseous at normal temperatures and pressures, or may use the vapor alone in the process with air or oxygen admixture, etc. I may also add water vapor or steam to the mixture before it reaches the reaction zone. I may also apply the method to liquefied or partially liquefied gases, as for example, liquefied propane-butane or liquefied ethane-propane mixtures. In such case, the gases when released from high pressure, pass into gaseous form at lower pressures and are mixed in this form with air or oxygen in my process. In all cases, the hydrocarbon-air mixture is in gaseous phase, whether a true gas is used or a hydrocarbon vapor or a mixture of both. If hydrocarbon vapor is used, either with or without hydrocarbon gas, I prefer to use the vapor of the more volatile hydrocarbons, such as gasolines or naphthas.

Taking, for example, the process of my copending applications, Ser. No. 132,570, filed November 21, 1916 (now Patent 1,675,029, granted June 26, 1928) and Ser. No. 695,194, filed February 26, 1924 (now Patent 1,588,836, granted June 15, 1926) which relates to the formation of formaldehyde and formic acid from hydrocarbons preferably in gaseous form, the amount of such industrial products obtained in one passage over the catalyst is relatively small, as the time of sojourn in the active catalytic region should be low, due to the decomposition of the formaldehyde if the time of sojourn is at all extended.

To overcome this difficulty, one feature of my present invention relates to returning the major portion of the gas and oxygen, or vapor and oxygen, or gas, vapor and oxygen mixture in the tail gas to the catalytic inlet for repeated treatment, adding fresh gas or vapor or both and oxygen to replace the amount taken out in the cycling, and maintaining a substantially uniform set of temperature and pressure conditions in the apparatus, while at the same time subjecting the major portions of any one mixture to repeated passage through the catalytic zone.

If, to overcome this difficulty, an extended series of catalytic furnaces is employed with scrubbing systems between them so that the mixture after passing through the first catalyst is passed through the scrubber to take out the industrial product, and then passed on to another catalytic furnace and so through a series, with or without adding fresh vapor and gas mixture or both with oxygen after each scrubbing operation before passing to the next catalyst, the expense of the operation becomes high if, for example, from ten to thirty of such furnaces are arranged in series.

I have found that I can carry out this operation with one reaction zone and after taking out the industrial product or part thereof from the tail gas can return the remaining exit gas or the major portion thereof to the apparatus, adding fresh gas or vapor or both with oxygen or air to replace the portion or portions removed, and can maintain substantially constant conditions in the system, so that any one portion of the mixture will cycle through the apparatus a large number of times, thus greatly increasing the recovery at fairly low cost. The total amounts withdrawn are preferably equal to the volume of fresh mixture added in each cycle, and of course, the smaller the volume of tail gas discarded, the smaller will be the volume of fresh inlet mixture and the greater the number of times which the major portion of the mixture will cycle through the catalyst, thus giving a greater conversion of the intermediate oxidation products by the oxygen of the mixture. By "tail gas" in this connection, I mean the gas remaining after the taking out of the condensible products from the mixture passing from the catalytic furnace.

Other features of my invention relate to the use of "intensified oxygen", that is, oxygen in a more active form than that in air at atmospheric pressures; in using a short time of sojourn in contact with the catalytic material; in controlling the temperature in the reaction zone; in applying heat to the mixture and regulating the same;

in applying pressure and varying it in the supply system.

I will now describe the form of apparatus shown in the drawing, it being understood that this may be varied within the scope of my invention.

In the drawing, 2 is an air pump and 3 is an ozonizer through which the air may be passed to increase the activity of the oxygen in the air stream. 4 is a valved by-pass around the ozonizer, so that the air may be passed direct into the system without passing through the ozonizer, whenever desired. The air then preferably passes to a constant pressure device 5, having a connected liquid vessel 6 with a small exit 7. From the constant pressure device, the air passes through tube 8, having a valve at 9 and past a visible flow meter 10 of the glass tube liquid type and into a mixer 11. The supply of gas or vapor or both passes to a pump 12, thence to a constant pressure device 13, having one tube leading into the lower part of the liquid in a vessel 14 with a small exit 15, at which the surplus may be taken off and may be burned. From the constant pressure device 13 the hydrocarbon gas or vapor or both passes through tube 16 valved at 16a, through visible flow meter 17, and thence into the supply tube 8 leading to the mixer.

From the tail gas pump 18, which is a circulating pump, a tube 19 leads to a constant pressure device 20 having one tube connected to a liquid vessel 21, with upper small outlet 22 from which a small proportion of the tail gas is taken off and may be burned, if it is combustible. From constant pressure device 20, a tube 23, valved at 24, leads to flow meter 25 and thence to the supply pipe 8 and the mixer 11. The mixer is preferably provided with a series of baffles giving a tortuous course to the mixture and insuring better mixing. From the mixer, the mixture passes into a moistening device 26, in which water vapor is added to the mixture, which then passes through a safety tube 27, filled with proper material to prevent back flashing, into a tube 28 having a connected manometer 29. The tube 28 leads into a circular passage 30, formed in the bottom of the catalytic furnace 31, this having a series of holes through which the mixture enters the furnace chamber. This bottom is heated by gas burners 32, the supply to which is valved, so that the preheating may be carefully regulated to supply the requisite amount of heat to the mixture without raising the temperature too much or beyond the desired limit in the catalytic zone. The temperature must be carefully regulated and held within certain limits; and the proportions of air with gas or vapor or both must be carefully regulated, all as in my previous filed applications. The preheated mixture thus regulated passes through a catalytic screen 33, having in contact therewith or adjacent thereto a thermocouple leading to an external indicator 34, by which the temperature can be seen at any moment. The catalyst preferably consists of the complex oxides or compounds of metals having a varying valence. All parts of the complex may consist of oxides of the same metal or of different metals. For example, an excellent catalyst in this connection consists of the so-called "blue oxides" of molybdenum which contain molybdenyl molybdonate ($MoO_2MoO_3$) and molybdenyl and molybdenite, and are probably all chemical compounds of two or more oxides of molybdenum representing different states of oxidation. These complexes may be regarded as salts, that is, compounds of one or more basic with one or more acid oxides.

Other complexes of value for such catalysts are chromic chromate $Cr_2O_3CrO_3$, tungsten tungstate $WO_2WO_3$, the manganese complexes, the vanadium complexes, etc.

The basic and acid parts of these complexes may be formed from oxides of different metals, in which case, each metal or group of metals used should possess varying valence. Examples of this class are:

Uranyl uranate --- $UO_2UO_3$
Cobalt molybdate --- $CoOMoO_3$
Cobalt molybdite --- $CoOMoO_2$
Di-uranyl vanadate --- $(UO_2)V_2O_5$
etc.

These metals whose complexes I prefer to employ as the acid part of the catalyst, since I have found them to be of high activity in this field, are the metals of high melting point electronegative low-atomic-volume having an atomic weight above 40. These metals appear on the Lothar-Meyer diagram of the periodic series beginning on the descending side of the third peak, descending side of the fourth peak and the descending side of further peaks developed since the date of this diagram. The class includes the following metals: titanium, vanadium, chromium, manganese, zirconium, niobium, molybdenum, tantalum, tungsten, and uranium. The basic oxides may be the lower oxides of these metals or may be the oxides of iron, copper, nickel, lanthanum, cobalt, thorium and the eight or nine rare earth metals. In both acid or basic portions there may be, of course, two or more of these combined.

The upper part of the furnace vessel 31 preferably projects above the enclosing furnace chamber 35, and its top portion 36 is preferably cooled as by air blasts or water cooling or in any desirable manner (not shown). The catalyst also should be as thin as possible to give a very small time of sojourn to the mixture therein, and the mixture should be taken away from the catalyst and cooled as rapidly as possible to avoid decomposition of the products after formation. The time of sojourn should be between one-quarter of a second and four seconds, and is preferably less than one second. From the upper portion of the catalytic chamber, a connection 37 leads through a condenser 38, having the proper water or other liquid connections 39 and 40. There is preferably a counterflow of the cooling liquid upwardly through this condenser around the coiled pipe leading through it, and the pipe 37 then leads into a water scrubber 41 where the tail gas is in direct contact with water. This scrubber is shown as of the bulbed tube variety, and is preferably chilled, as with ice. From this scrubber, the tube 42 leads the tail gas through an ice-cooled trap 43 and into an ice-cooled water scrubber 44. From this scrubber, the gas passes through tube 45 and through a sampling pipette system 46, by which the gas may be sampled at any time, this having suitable valve connections as usual in such sampling types of pipettes. From this sampling device, the tail gas may pass through a water scrubber or scrubbers 47 of the bulbed type shown at 41, and thence to the pump; or it may bypass to a scrubber 48 of the chemical type, such as vessels containing $NaHSO_3$, if desired, and thence to the tail gas pump 18. The gas may also pass directly from the bulbed water scrubbers to the pump.

The pumps are all preferably of the variable speed variety and the proper speeds are given them to keep the proportions, pressures, speeds, speed of flow, etc. fairly constant after an equilibrium has been established in the apparatus.

In starting the apparatus, I preferably apply heat to the furnace and cycle through the entire apparatus the gas or vapor or gas and vapor mixture without oxygen or air, allowing a part of the tail gas to pass off until the system is filled and in fair equilibrium as to temperature. Air is then supplied with the gas or vapor fed in to replace the amount of tail gas taken off, and thus the apparatus is gradually filled with a mixture containing more and more air until the right proportions of air and hydrocarbon are attained and equilibrium is established. This can be readily ascertained by analyzing the tail gas taken off. When this tail gas taken off is substantially uniform in character, the apparatus is in complete operation and the regular process proceeds under substantially constant temperature and pressure conditions, the temperature being regulated by regulating the burners, supplying external heat to the mixture, and the pressure being regulated by regulating the take-off caps. During the preparatory operation, the temperature is preferably gradually raised. If air is used at ordinary atmospheric pressure, the mixture should be in the proportion of one volume of gas or gas and vapor to not over three and one-half volumes of air. In case I use "intensified oxygen" either by supplying pure oxygen in whole or in part or by running the apparatus under pressure, the proportions in the mixture should be changed.

As regards temperature in the catalytic zone, this should in general be somewhat lower than in the one-passage cases before referred to. In the cases hereafter described where pure oxygen is used, the temperature should not rise above 500° C., and in any case should not be above 600–625° C. The proportions in the mixture admitted in each cycle are preferably in the explosive range, this, of course, forming only a minor part of the mixture passing to the catalytic furnace. Consequently, the operation should not be started with the complete mixture until later in the starting operation. I will now describe certain experiments with such apparatus.

The thickness of catalyst layer in the first set of tests was 1.27 cm. and its area 730 sq. cm. The total weight of catalyst and asbestos on which it was deposited was 385 grams, of which 311 grams was molybdenum trioxide. This oxide usually changes into a complex mixture of the blue oxides of molybdenum together with some molybdenum dioxide.

From this data the time of sojourn of any test is calculated as being the time it takes an imaginary layer of gas, one molecule thick, to pass through the catalyst layer. That is, the length of travel between the screens holding the catalytic mass in place in the test described. The ozonizer was bypassed in the following experiments.

*The first set of tests.*—The first test was a straight flow with no cycling. The gas used was a dry natural gas containing 85 to 90% of methane. The thickness of catalyst, 1.27 cm.; area, 730 sq. cm. The mixture was six liters of gas per minute mixed with six liters of air per minute. The time of run was ten hours; time of sojourn 1.8 seconds. The temperature at the center of the catalyst was 425° C. The amount of methane fed in was approximately 2570 grams.

On analyzing the gas beyond the scrubbers, it was found to contain the following by volume:

| | Percent |
|---|---|
| Carbon dioxide | .6 |
| Oxygen | 6.4 |
| Unsaturated hydrocarbons | 1.2 |
| Carbon monoxide | 1.2 | the balance being largely methane, nitrogen, etc.

The formaldehyde recovered from the water scrubbers was 7.85 grams, being .31% by weight of the methane passed into the apparatus. The methane passing to $CO_2$ was 30.8 grams; that passing to $CnH_{2n}$ 61.7 grams; that passing to CO 113.1 grams; that passing to $CH_2O$ 4.1 grams.

This test shows the conversion in one passage of a 50—50 mixture once through the apparatus. The percentage of formaldehyde by weight on the methane treated will serve as an index to the effects of cycling gas after passing through the scrubber.

*The second test.*—In this test, the total gas passing through the catalyst per minute was the same as in the preceding, but was made up as follows:

2 liters of fresh methane
2 liters of fresh air
8 liters of return or tail gas from the scrubbers.

This return gas was approximately two thirds of the total gas in circulation, one-third being discarded at each cycling before returning to the inlet from the scrubbers. This method of feeding reduces the "new" hydrocarbon introduced. The total methane passing into the apparatus is now 857 grams in the ten-hour run. Other conditions were the same as in the first test.

The gas beyond the scrubbers was found to contain:

| | Percent |
|---|---|
| $CO_2$ | .9 |
| $O_2$ | 6.2 |
| $CnH_{2n}$ | 1. |
| CO | 2.5 | the balance being methane, nitrogen, etc.

There was recovered from the scrubbers 5.97 grams of formaldehyde which equals .70% of the methane passed into the apparatus. The methane going to $CO_2$ was 15.7 grams; that going to $CnH_{2n}$ was 17.1 grams; that going to CO was 42.8 grams; that going to $CH_2O$ was 3.18 grams.

This might be called 1 to 2 cycling; that is, the new mixture was one-half the return or tail gas. It will be noted that in this 1 to 2 cycling, more than twice as much formaldehyde was obtained from approximately one-third as much methane as was passed into the apparatus in the first test.

*The third test.*—In this case, the twelve liters of gas per minute was made up as follows:

1 liter of fresh methane
1 liter of fresh air
10 liters of return gas.

The total methane passed into the apparatus during the ten-hour run was 428 grams. Other conditions were the same as in the first test. In this case, the gas beyond the scrubbers was:

| | Percent |
|---|---|
| $CO_2$ | 1.4 |
| $O_2$ | 6.4 |
| $CnH_{2n}$ | 1.0 |
| CO | 2.0 | the balance being $CH_4$, $N_2$, etc.

The total formaldehyde recovered from the scrubbers was 8.64 grams, being equivalent to 1.98% by weight of the $CH_4$ introduced. The methane passing to $CO_2$ was 12 grams; that passing to $C_nH_{2n}$ was 8.5 grams; that passing to CO was 17.1 grams; that passing to $CH_2O$ was 4.52 grams.

In this case, we obtained approximately six times as much formaldehyde in a ten-hour run from one-sixth as much methane passed into the apparatus as in the first test, the cycling ratio being 1 to 5.

*The fourth test.*—In this case, the inlet gas was made up of three-fourths of a liter of fresh methane per minute; three-fourths of a liter of fresh air per minute; and ten and one-half liters of return gas per minute. The total methane passed into the apparatus during the five-hour run was 161 grams. Other conditions were the same as in the first test. In the results, the gas beyond the scrubbers showed:

|  | Percent |
|---|---|
| $CO_2$ | 1.7 |
| $O_2$ | 2.3 |
| $C_nH_{2n}$ | 1.2 |
| CO | 2.1 | the balance being $CH_4$, $N_2$, etc.

In this case, the total formaldehyde recovered from the scrubbers was 2.85 grams, being 1.77% by weight on the methane passed into the apparatus. The percentage of methane to $CO_2$ was 5.5 grams; that to $C_nH_{2n}$ 3.9 grams; that to CO, 6.9 grams, and that to $CH_2O$, 1.52 grams.

In the third test, I reached the largest yield at atmospheric pressure of formaldehyde based on methane, and I believe that the lower concentration of oxygen and the greater dilution of the oxygen and methane in the gas stream were responsible for the fact that there was no improvement in this 1 to 7 cycling, as compared with the preceding 1 to 5 cycling. This conclusion is further supported by the results of the next test.

*The fifth test.*—In this case, the twelve liters per minute of inlet gas were made up as follows:

½ liter fresh methane per minute
½ liter of fresh air per minute
11 liters of return gas per minute.

The total methane passing into the apparatus in a five-hour run was 107 grams. Other conditions were the same as in the first test. In the results, the gas beyond the scrubbers showed:

|  | Percent |
|---|---|
| $CO_2$ | 2.6 |
| $O_2$ | 2.3 |
| $C_nH_{2n}$ | 1.1 |
| CO | 2.0 | the balance being methane, $N_2$, etc.

The total formaldehyde recovered from the scrubbers was 2.01 grams, being 1.88% by weight of methane passed into the apparatus. The percentage of methane to $CO_2$ was 5.8 grams; that to $C_nH_{2n}$ was 2.4 grams; that to CO was 4.2 grams, and that to $CH_2O$ was 1.07 grams.

The results of this last test taken in conjunction with the set of preceding tests, show that under the given set of conditions, a point of maximum formaldehyde production was reached at a cycling ratio of about 1.5, with the air and gas at atmospheric pressure.

A run was also made to ascertain whether increased temperature would increase the formaldehyde yield. In this case, the time of sojourn was .995 second, the cycling ratio was 1.9 and the temperature 450° C., other conditions being as in the last test. The percentage by weight of formaldehyde obtained, as based on the methane, was only 1.59%.

Believing that the third test of the series represented the best percentage of product obtainable with the relatively thick layer of catalyst used and cycling at atmospheric pressure, I decided to change the catalyst to a thinner layer and to get the effect of increased pressure by using oxygen instead of air. Of course, increasing the pressure in the apparatus will increase the amount of oxygen per unit of volume, and the same effect is obtained by introducing oxygen with air or by introducing oxygen alone. In other words, it is desirable to bring into the mixture in contact with the catalyst a greater number of oxygen and methane molecules in a given time. This is preferably done by compressing the methane with enough air to obtain the best oxygen methane molecular volume concentration. To obtain this effect, I made the following tests where the catalytic layer was one-half as thick as in the first set of tests, and pure oxygen was used instead of air, a higher temperature being employed.

*Oxygen test No. 1.*—Temperature 500° C. The inlet gas had the following composition:

1 liter per minute of fresh methane
½ liter per minute of fresh oxygen (99%)
16 liters per minute of return gas from the scrubbers, approximately 1½ liters per minute being discarded between the scrubbers and the inlet before the new gases were introduced, this being done at the exit from the constant pressure device for the tail gas.

The time of sojourn was .574 second and the duration of run five hours. The total weight of the methane introduced was 214 grams, other conditions being similar to those in the first tests. In these tests, the composition of the gas entering the catalytic screen is as follows: carbon dioxide—4.60%; oxygen—7.40%; olefins ($C_nH_{2n}$)—2.0%; carbon dioxide—3.47%; nitrogen (from the commercial oxygen used and from the natural gas used)—4.20%; methane and ethane—78.33%. In the results, I found in the gas beyond the scrubbers:

|  | Percent |
|---|---|
| $CO_2$ | 5. |
| $O_2$ | 5. |
| $C_nH_{2n}$ | 2.2 |
| CO | 3.8 | the balance being mostly methane and some $N_2$.

The weight of formaldehyde recovered from the water-scrubbing system was 14.26 grams, which is 6.65% on the weight of methane introduced. Of the methane, 16.2 grams passed to $CO_2$; 7.1 grams to $C_nH_{2n}$; 12.2 grams to CO and 7.6 grams to $CH_2O$. The methane actually attacked was 41.3 grams and hence, the percentage of methane which was converted to formaldehyde in the methane attacked amounted to 17.63%, which amounted to 33.04% in weight of formaldehyde yield based on methane attacked. This test shows the marked improvement in formaldehyde yield obtained by increasing "molecular volume concentration" of the oxygen and methane, that is, by having more oxygen and methane molecules in a given volume in a given time in the catalytic mass, the diluting effect of the nitrogen is reduced and almost eliminated.

If, instead of using oxygen, I employ air under pressure, the nitrogen is, of course, present, but by compression, I can attain largely the same as the pure oxygen results by bringing the same or even a greater number of oxygen and methane molecules into the volume at, say, a pressure of 100 pounds or more per square inch on the gas and oxygen entering the reaction zone.

*Oxygen test No. 2.*—In this case, the inlet gas had:

½ liter per minute of fresh methane
½ liter per minute fresh oxygen (99%)
19 liters per minute of return gas from the scrubbers, somewhat less than 1 liter per minute being taken out in a cycle, because of the contraction due to more marked oxidation in this experiment.

The time of sojourn was .5 second, the duration of the run five hours, 107 grams of methane being introduced. The result showed in the gas beyond the scrubbers:

| | Percent |
|---|---|
| $CO_2$ | 8.3 |
| $O_2$ | 22.3 |
| $CnH_{2n}$ | 1.4 |
| $CO_2$ | 2.8 | the remainder being methane, $N_2$, etc.

The weight of formaldehyde recovered from the water-scrubbing system was 11.55 grams, this being 10.8% of the weight of methane introduced. In this case, the methane attacked was 30.37 grams of which 5.7 grams passed into formaldehyde, which is 18.9% of the methane attacked. This gave a weight of yield of 38% of formaldehyde based on the methane attacked.

Owing to the large volume change in this test, I believe that the distribution of the methane cannot be calculated for the substance other than formaldehyde. Since this is caught in the water scrubbers and is not affected by the volume changes, this figure is fairly accurate.

Higher oxygen concentrations enable me to cycle a greater number of times, and to further increase the production of formaldehyde beyond that possible with air at atmospheric pressure.

*Oxygen test No. 3.*—In this case, the inlet gas had:

.25 liter fresh methane per minute
.25 oxygen (99%) per minute
19.50 tail gas returned per minute This may be called "1—40" cycling. The time of the run was five hours and the time of sojourn about .50 second. The temperature was 450° C. The total methane passed in was 52.6 grams. The exit gas analysis showed:

| | Percent |
|---|---|
| $CO_2$ | 13.6 |
| $O_2$ | 7.2 |
| $CnH_{2n}$ | 1.2 |
| $CO$ | 3.0 | the balance being principally $CH_4$ with some $N_2$, etc. The total formaldehyde recovered was 5.9 grams, which makes the percentage by weight of formaldehyde treated to 11.6% or 6% of methane converted to formaldehyde.

*Oxygen test No. 4.*—A run exactly like that of No. 3 was made, except that the inlet gas mixture was saturated with moisture at a few degrees lower temperature. In this case, the exit gas showed:

| | Percent |
|---|---|
| $CO_2$ | 14.8 |
| $O_2$ | 8.4 |
| $CnH_{2n}$ | 1.4 |
| $CO$ | 3.2 |

The total formaldehyde recovered in this case amounted to 6.86 grams, which was 13% of the methane treated, hence, the percentage of methane converted to formaldehyde was 7%.

In all the foregoing tests, I have included the product formed during the time preceding the equilibrium period, since at intermittent experimental work this should be included. In practical operation, however, this will make a negligible difference.

*Oxygen test No. 5.*—In this test, the conditions were the same as in oxygen tests Nos. 3 and 4, except that a regular scrubbing recovery system was not switched in until after equilibrium had been established. This test, therefore, represents the actual conversion under equilibrium conditions. In this case, the composition of the gas entering the catalytic screen was carbon dioxide—14.25%; oxygen—8.54%; nitrogen—3.78%; olefins—1.35%; carbon monoxide—2.95%; methane, etc. 69.13%. In this case, the exit gas analysis showed:

| | Percent |
|---|---|
| $CO_2$ | 14.6 |
| $O_2$ | 7.5 |
| $CnH_{2n}$ | 1.4 |
| $CO$ | 3.0 |

The total formaldehyde recovered was 7.16 grams, which is 13.7% of the weight of methane treated, hence 7.3% of the weight of the methane was converted into formaldehyde. In this case, the methane attacked amounted to 19.25 grams and 20% of this passed into formaldehyde. The weight of formaldehyde obtained was therefore 37.5% based on the amount of methane attacked.

*Oxygen test No. 6.*—In this test, I used a lower oxygen content in the system. The mixture was the same as that in the last tests, except that the inlet mixture contained .3 liter of methane per minute and .2 liter of oxygen (99%) per minute. In this case, the exit gas showed:

| | Percent |
|---|---|
| $CO_2$ | 12.8 |
| $O_2$ | 3.3 |

The formaldehyde recovered was 6.93 grams, which is 11.1% of the weight of methane treated, hence the methane converted to formaldehyde was 5.9%. The mixture in this case was a safer mixture for actual operation than in the one preceding.

These tests show that to attain a high yield of formaldehyde, it is necessary to have in a given volume of the mixture as many molecules of oxygen and methane as possible within the safe limits of working, hence, these tests show the importance of working with air under pressure, in order to obtain this "volume concentration", as the cost of pure oxygen is relatively high.

One of the advantages of taking out a portion of the tail gas after the condensation and removal of product from the cycle lies in the reduction of the nitrogen dilution where air is employed. One of the advantages of cycling lies in the carbon dioxide formation and its return to the catalytic chamber. This return increases the yield of formaldehyde by hindering further carbon dioxide formation and also makes it possible to work safely with higher oxygen concentration.

It is important that the nitrogen dilution should not proceed too far, and this is one of the objects of checking out of the system a part of the tail gas after removal of the industrial product. It is also important to keep substantially constant conditions as to pressure and temperature after the system is in full operation.

The system may be used without a catalyst, although it is far preferable to use a catalyst, and oxides of molybdenum are especially good for this purpose. Of course, there may be a plurality of the catalytic reaction zones included in the cycle instead of one, as shown. If more than one is included, each should have its absorbing system, etc.

By the term "intensified oxygen" in the claims, I intend to cover and include air under pressure, the use of oxygen either in air or by itself, or ozonized air. By the term "hydrocarbons" in the broader claims, I intend to cover either a hydrocarbon or hydrocarbon derivative.

Many changes may be made in the form of the apparatus and the parts thereof, as well as in some of the steps within the scope of my broader claims.

All claims herein are limited to bleeding out a portion of tail gas and to adding fresh hydrocarbon and oxygen in a continuous recycling process. Other features and combined method steps are included in my United States Patent No. 1,858,095, of May 10, 1932, forming a division of the parent case, Ser. No. 745,025, filed October 21, 1924, as well as in the parent case, Ser. No. 745,025, which is copending herewith.

I claim:

1. In a partial oxidation process, the steps consisting in passing a mixture of hydrocarbon and oxygen in gaseous phase through a reaction zone, condensing and removing an oxidized hydrocarbon product from the resulting gas stream, taking a portion of the tail gas out of the system, adding a fresh portion of hydrocarbon and oxygen, and again passing the new mixture through a reaction zone and again condensing and removing an oxidized hydrocarbon product from the gas stream.

2. A process as set forth in claim 1, carried out under superatmospheric pressure.

3. A process as set forth in claim 1, carried out by supplying external energy to force circulation of the reaction mixture.

4. In a partial oxidation process, the steps consisting in passing a mixture of hydrocarbon and oxygen in gaseous phase through a reaction zone, condensing and removing an oxidized hydrocarbon product from the resulting gas stream, taking a portion of the tail gas out of the system, adding a fresh portion of hydrocarbon and oxygen, again passing the new mixture through a reaction zone, and again condensing and removing an oxidized hydrocarbon product from the gas stream, while maintaining substantially constant conditions in the stream.

5. A process as set forth in claim 4 in which the hydrocarbon of the mixture of hydrocarbon and oxygen in gaseous phase is a hydrocarbon gas having a plurality of carbon atoms.

6. In a partial oxidation process, the steps consisting in passing a mixture of hydrocarbon with oxygen in gaseous phase through a reaction zone in contact with a solid catalyst with a time of sojourn between one quarter of a second and four seconds, removing an industrial oxidized hydrocarbon product from the resulting gas stream, removing a portion of the tail gas from the stream, adding a fresh portion of hydrocarbon-oxygen mixture, and passing the fresh mixture again through the reaction zone while maintaining substantially constant conditions in the cycle.

7. In a partial oxidation process, the steps consisting in passing a mixture of hydrocarbon and oxygen in gaseous phase through a reaction zone in contact with a catalyst, condensing and removing an oxidized hydrocarbon product from the resulting gas stream, taking a portion of the tail gas out of the system, adding a fresh portion of hydrocarbon and oxygen, again passing the new mixture through a reaction zone, and again condensing and removing an oxidized hydrocarbon product from the gas stream.

8. In a partial oxidation process, the steps consisting in passing a mixture of hydrocarbon with oxygen in gaseous phase through a reaction zone in contact with a solid catalyst with a time of sojourn between one-quarter of a second and one second, removing an industrial oxidized hydrocarbon product from the resulting gas stream, removing a portion of the tail gas from the stream, adding a fresh portion of hydrocarbon-oxygen mixture, and passing the fresh mixture again through the reaction zone while maintaining substantially constant conditions in the cycle.

9. In the manufacture and production of organic compounds containing oxygen by catalytic oxygenation of hydrocarbons in a circulatory system under pressure and at an elevated temperature and in the presence of a catalyst capable of causing the formation of formaldehyde, the step of employing a gas mixture containing a high percentage of an inert gas not required for the reaction and continuously removing part of the gas from the circulatory system and replacing it by fresh gas mixture in such proportion as to maintain a substantially constant composition of the circulating gas mixture.

JOSEPH HIDY JAMES.